United States Patent Office 2,974,637
Patented Mar. 14, 1961

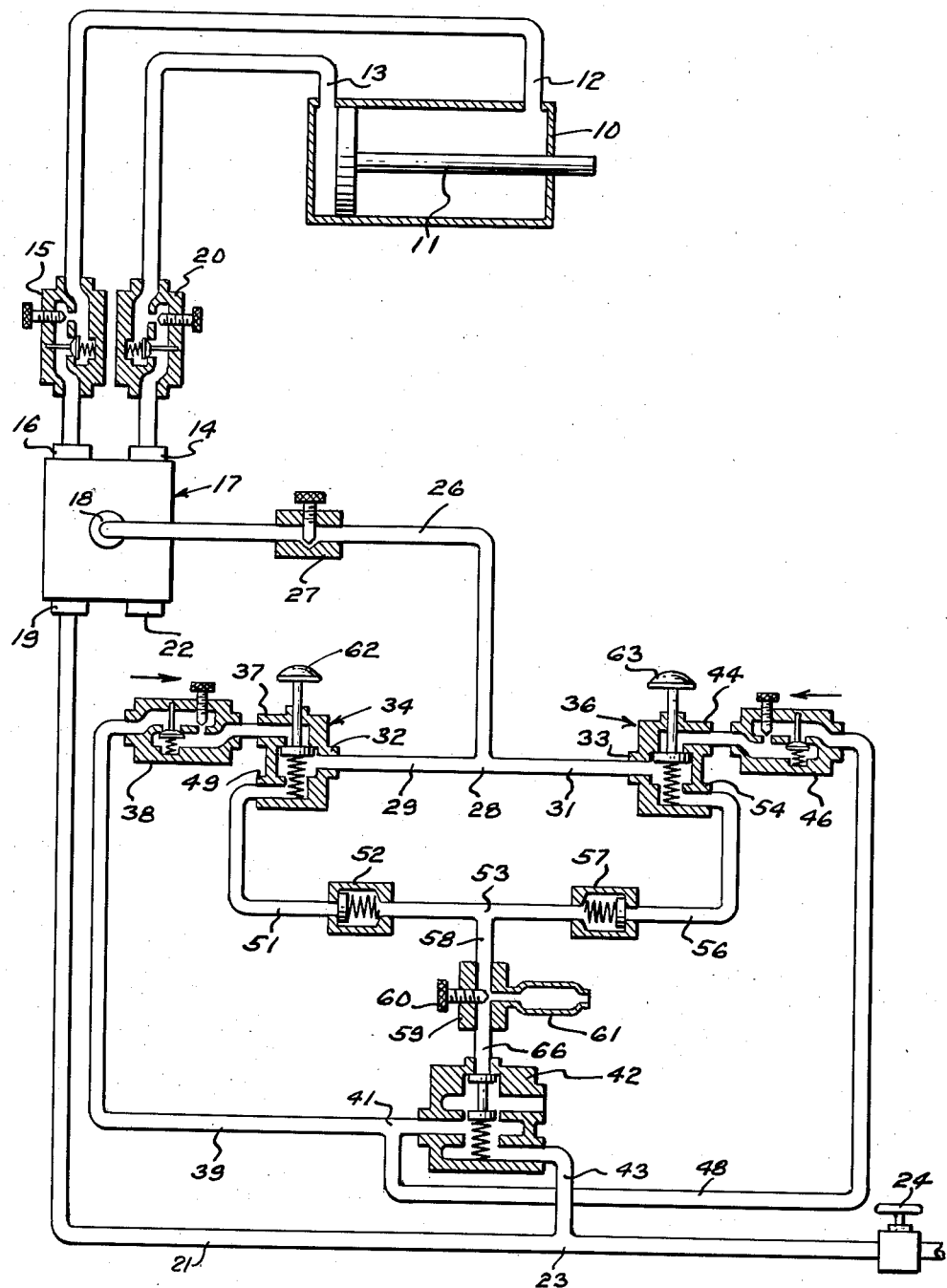

2,974,637

PNEUMATIC TWO-HAND CONTROL FOR POWER MACHINERY

Ralph A. Holmes and Harold R. Wilson, Indianapolis, Ind., assignors to Western Electric Company, Incorporated, New York, N.Y., a corporation of New York Filed Dec. 30, 1957, Ser. No. 706,178

3 Claims. (Cl. 121—38)

This invention relates to a pneumatic two-hand control for power machinery, and more particularly to an all pneumatic control system requiring an operator to simultaneously actuate two separate valves in order to apply sufficient pressure to operate a master control valve for the power machinery.

Operators of power controlled presses, cutters or other metal fabricating machines are subject to frequent injuries due to failure of safety devices. In general, a two-hand safety device for such machines usually employs electrical or mechanical facilities or combinations thereof together with pneumatic actuated instrumentalities for insuring that the operator's hands are clear of the dangerous moving parts of the machine before the machine can be initiated into a cycle of operation. Often due to the inflammable nature of the material being worked upon, it is necessary that all possibilities of generating sparks be avoided. In general, electrical and mechanical devices are inherently susceptible to the production of sparks.

It is a prime object of this invention to provide a simple and reliable all pneumatic two-hand control safety device for power driven machines.

Another object of the invention is the provision of a foolproof two-hand control system requiring simultaneous operation in order to provide sufficient air pressure to initiate a cycle of operation of a machine.

An additional object of the invention resides in a pneumatic control system requiring simultaneous operation of two spaced valves to produce a pneumatic pulse of sufficient magnitude to initiate operation of a power control machine.

A further object of the invention resides in a pneumatic two-hand control system having a bleeder arrangement therein for precluding the application of sufficient pneumatic pressure to operate a machine whenever the hand controls are operated seriatim or one of the controls is fastened down and the other control is subsequently operated.

With these and other objects in view, the present invention contemplates an arrangement of commercially available pneumatic devices to provide a two-hand control for a power-operated machine. The pneumatic system includes two hand-operated valves that must be simultaneously operated to provide an air pressure pulse of sufficient magnitude to operate a master control valve that functions to supply fluid air to initiate operation of the machine. If only one valve is operated or one valve is tied down and then the other valve is subsequently operated, a bleeder valve in the system is rendered effective to reduce the pneumatic pressure within the system so that the closure of one valve or the sequential closure of both valves results in the application of a pneumatic pulse of insufficient magnitude to operate the master control valve.

Other objects and advantages of the present invention will be apparent from the following detailed description when considered in conjunction with the accompanying drawing wherein the single figure illustrates an all pneumatic two-hand control system embodying the principles of the invention.

There is shown in the upper portion of the drawing a cylinder 10 having a piston 11 therein that is adapted to be connected to and operate a desired piece of machinery (not shown). This piston can also be connected to other types of apparatus, the position of which it is desired to control; for example, a work holder that feeds work pieces into an automatic milling machine. A pair of conduits 12 and 13 connect, through a pair of speed control valves 15 and 20, the forward and rearward extremities of the cylinder with a pair of ports 14 and 16 of a master control valve 17. In general this master control valve is of the type that is adapted to be operated upon the application thereto of a predetermined pneumatic pressure pulse. This pulse is applied to a pilot port 18 to shift the internal valve mechanism. In an actual installation of the subject system, it was found that satisfactory operation could be obtained by use of a four-way master control valve manufactured by the Hannifin Corporation of Des Plaines, Illinois, and identified in their catalogue as Model No. P–M, Series BB1–37. Other types of valves will operate satisfactorily in this system so long as the valves function to shift the internal valve mechanism upon each receipt of a pressure pulse above a predetermined magnitude. This valve has an inlet port 19 connected to a main pneumatic supply line 21 and also an exhaust port 22. The supply line 21 is connected through a T-fitting 23 and a shut-off valve 24 to a source of compressed air (not shown).

Assume that in the initial condition, the valve 17 is set to connect the supply port 19 with the outlet port 16, thus the piston 11 will be withdrawn within the cylinder 10 as shown in the drawing. The subsequent application of a predetermined air pressure pulse through the pilot port 18 functions to switch the valve mechanism to connect the supply port 19 with the outlet port 14, and simultaneously therewith the exhaust port 22 is connected to the outlet port 16. Air pressure will then be applied, through valve 20 and through the conduit 13 to move the piston forward. The air trapped within the piston 10 is exhausted through conduit 12 through the outlet port 16 and through the internal valving arrangement of the valve 17 through the exhaust port 22. Upon receipt of a second pressure pulse of the predetermined magnitude, the valve mechanism is shifted to again connect the outlet port 16 with the air pressure supply line 21 whereupon the piston is moved back to the illustrated initial position.

The pilot port 18 is connected through a conduit 26 having a gate valve 27 therein to a T-fitting 28 having a pair of branch conduits 29 and 31 connected thereto. These branch conduits terminate in connections to outlet ports 32 and 33 of a pair of three-way hand operated control valves 34 and 36 which may be of the type produced by the Hannifin Corporation and identified in their catalogue as Model C3–25.

Hand operated valve 34 has an inlet port 37 that is connected through a throttle valve 38, through a conduit 39, through a T-fitting 41, through a three-way pressure valve 42 and through a conduit 43 to the T-fitting 23 connected in the main air supply line 21. Valve 42 is a three-way pressure valve of the type produced by the Hannifin Corporation and identified as a P.M. Series C–10–25. This valve has a spring loaded poppet that may be shifted upon application of a relatively small pressure to the upper surface of the poppet. In a like manner, the valve 36 has an inlet port 44 that is connected through a throttle valve 46, through a conduit 48 to the T-fitting 41 which is connected to the main air supply line 21. Valve 34 has also a second outlet port 49 that is connected through a branch conduit 51 and a check valve 52 to a T-fitting 53. Similarly, the valve 36 is provided with a second outlet valve 54 that is connected through a branch conduit 56 and a swing check valve 57 to the T-fitting 53. T-fitting 53 is connected by means of a conduit 58 to a bleeder valve 59. This bleeder valve may be of any of a vast number of valves that are commercially available on the market and is provided with an adjusting screw 60 to regulate the bleeding action, and a muffler 61.

Throttle valves 38 and 46 and speed control valves 15 and 20 may be of the type manufactured by the Hannifin Corporation and identified in their catalogue as Model SM1-25. This type of throttle valve has a spring control poppet that permits the free flow of air when the pneumatic pressure is applied in the direction indicated by the arrows on the drawing. When pneumatic pressure is against the free flow direction, air pressure and the force of the poppet spring force the poppet to seat, air flow then must be through a regulated orifice that is controlled by an adjusting needle.

Assuming that in the initial condition the valve 17 is set to connect the supply port 19 with outlet port 16, air will pass through to throttle valve 15, through conduit 12 and into cylinder 10, retracting piston 11. Simultaneously air is admitted through T-fitting 23 and conduit 43 to valve 42 to fitting 41 where the air divides and passes through conduits 39 and 48 to throttle valves 38 and 46 and through ports 37 and 44 of hand control valves 34 and 36.

In operation of the system with the piston 11 withdrawn as illustrated, the operator will simultaneously operate a pair of levers or buttons 62 and 63 whereupon air is admitted from the supply line 21, through the conduit 43, through valve 42, through the T-fitting 41 and simultaneously through the branch conduits 39 and 48, through the throttle valves 38 and 46 to the inlet ports 37 and 44 of the valves 34 and 36. These valves simultaneously operate to apply air to the branch conduits 29 and 31 to produce a short culminant pressure pulse that is impressed through the T-fitting 28 through the conduit 26 and the gate valve 27 to the pilot port 18. The valve 17 then shifts its internal valving mechanism to connect the inlet port 19 with the outlet port 14 whereupon compressed air is passed through the valve 20 and the conduit 13 to the cylinder 10 causing the piston 11 to advance toward the right. Exhaust air is forced out of cylinder 10 through conduit 12, through valve 15 and the port 22 of the valve 17 to the atmosphere.

When the valves 34 and 36 are released, air in the conduits 26, 29 and 31 passes through the outlet ports 49 and 54, through conduits 51 and 56 and through the check valves 52 and 57 (now opened) and to common T-fitting 53 whereafter the air is exhausted by bleeding through the valve 59. The pressure applied to the bleeder valve 59 is also applied to a conduit 66 connected to control the poppet within valve 42; however this pressure is of insufficient magnitude to operate the valve 42.

Upon subsequent operation of the levers 62 and 63, a second pressure pulse of the necessary magnitude is applied to the valve 17 whereupon the internal valving mechanism is restored to the initial condition and compressed air is passed through the conduit 12 to restore the piston 11 to the initial position.

Again assume that the parts are as shown in the drawing and that an operator has tied down the lever 63 so that air is continuously passed through the valve 36 to the master control valve 17. The closure of the lever 63 does not allow a volume of air of sufficient pressure to be applied to operate the valve 17 because the air can now pass through conduits 31 and 29, through unoperated valve 34, through outlet port 49, through conduit 51, through check valve 52, through conduit 58, and through the bleeder valve 59 and muffler 61 to the atmosphere. As this flow of air is relatively unrestricted and at considerable pressure, the air pressure applied through conduit 66 is sufficient to operate the valve 42, thereby momentarily cutting off the air supplied to the conduits 39 and 48. The air pressure in conduit 66 will accordingly drop allowing the valve 42 to return to the initial position whereupon air again is passed through system to again operate valve 42. This cyclic operation of the valve 42 will continue as long as only one valve 34 or 36 is operated.

The subsequent closure of the lever 62 allows air to pass through the valve 34 to produce a slight pressure pulse that is insufficient in magnitude to operate the valve 17. This is due to the fact that the air in the branch conduit 31 is reduced due to the action of the bleeder valve 59. More particularly, the air in the branch conduits 39, 48 and 31 is reduced by the operation of the valve 42 in cooperation with the bleeder valve 59. As previously described, this is accomplished by a build up of air within the conduit 66, thereby resulting in the actuation of the valve 42. Since the pressure on the valve 42 exerted through the conduit 66 is constantly being relieved by the bleeder valve 59, a momentary and cyclic operation of the valve 42 results, thereby intermittently cutting off the air supply to the above-mentioned branch conduits 39, 48 and 31.

It is only when both levers 62 and 63 are operated that sufficient air pressure in the form of two simultaneous pressure pulses are passed through the valves 34 and 36 to culminate in a single pressure pulse of sufficient magnitude to operate the master control valve 17. If only one valve 34 or 36 is operated, a pressure pulse of insufficient magnitude is produced that will not operate the valve 17. If one of the valves 34 or 36 is tied or held in an operated position and the other valve is subsequently operated, the resulting pressure pulses produced are of insufficient magnitude to operate the master control valve 17.

It is to be understood that the above-described arrangements of apparatus and selection of elemental parts are simply illustrative of an application of the principles of the invention and many other modifications may be made without departing from the invention.

What is claimed is:

1. A two-hand control system for a machine, which comprises a pair of hand operated valves each having an inlet and a pair of outlets, a first conduit having branches running to two of said outlets associated with separate valves, a second conduit having branches running to the other two outlets, a master valve connected to said first conduit and adapted to be operated by the simultaneous application of pneumatic pressure pulses of predetermined magnitude, a bleeder valve connected to said second conduit, a three-way pressure valve connected to said bleeder valve, and means within said three-way pressure valve and actuated by either the sequential operation or the operation of only one of said hand-operated valves for interrupting the application of pneumatic pressure pulses to said master valve.

2. A two-hand pneumatic control system including a master control valve adapted to be actuated by application of a pneumatic pressure pulse of predetermined magnitude, a conduit connected at one end to operate said master valve, a pressure source, a pair of hand-operated valves connected to the other end of said conduit and simultaneously operable to apply said predetermined pressure pulse over said conduit to said master control valve, a three-way pressure valve connected between said pressure source and said hand-operated valves, and means within said three-way pressure valve actuated by operation of one of said hand-operated valves for precluding application of said predetermined pressure pulse to said master control valve.

3. An all-pneumatic two-hand control system, which comprises a pressure source, a supply line connected to said pressure source, a master control valve responsive to a pressure pulse of predetermined magnitude, said master control valve having a pair of outlet ports and a single inlet port together with an exhaust port, conduit means connecting said inlet port to said supply line, said master valve having a pilot port for receiving pulses of air to switch the inlet port from one outlet port to the other and switch the exhaust port from one outlet port to the other, a pair of hand-operated three-way valves each having an inlet port and a pair of outlet ports, a pressure pulse conduit connected at one end to said pilot port, a pair of branches each connected at one end to said pressure pulse conduit and at the other ends to separate outlet ports of said hand-operated valves, a bleeder valve connected to the other pair of outlet ports of said hand-operated valves, a three-way pressure valve, conduit means connecting said three-way pressure valve to said supply line and bleeder valve, conduit means connecting said three-way valve to both said hand-operated valves, and means within said three-way pressure valve cooperable with said bleeder valve and rendered effective by the operation of one of said hand-operated valves for precluding application of said predetermined pressure pulse to said master control valve.

References Cited in the file of this patent

UNITED STATES PATENTS 2,346,829    Davis _____ Apr. 18, 1944